(12) United States Patent
Fernandez

(10) Patent No.: US 6,921,286 B1
(45) Date of Patent: Jul. 26, 2005

(54) LIGHT EMITTING DIODE JUMPER CABLES

(76) Inventor: Robert Fernandez, 8620 NW. 190 Ter., Miami, FL (US) 33015

( * ) Notice: Subject to any disclaimer, the term of this patent is extended or adjusted under 35 U.S.C. 154(b) by 0 days.

(21) Appl. No.: 10/303,170

(22) Filed: Nov. 25, 2002

(51) Int. Cl.[7] ............................................... H01R 11/00
(52) U.S. Cl. ...................... 439/503; 439/504; 439/490; 362/800
(58) Field of Search ................................ 439/502, 503, 439/504, 506, 488, 490; 362/800, 249, 514

(56) References Cited

U.S. PATENT DOCUMENTS

| | | | |
|---|---|---|---|
| 3,942,859 A | | 3/1976 | Korodi |
| 4,420,711 A | * | 12/1983 | Takahashi et al. .......... 315/296 |
| 4,938,712 A | * | 7/1990 | Black .......................... 439/490 |
| 4,969,834 A | * | 11/1990 | Johnson ...................... 439/141 |
| 5,230,637 A | * | 7/1993 | Weber ......................... 439/504 |
| 5,434,013 A | * | 7/1995 | Fernandez .................. 428/690 |
| 5,566,384 A | * | 10/1996 | Chien .......................... 362/486 |
| 5,833,493 A | * | 11/1998 | Hung .......................... 439/504 |
| 5,917,288 A | * | 6/1999 | Feldman et al. .......... 315/169.3 |
| 5,955,957 A | * | 9/1999 | Calabrese et al. ....... 340/691.8 |
| 6,123,576 A | | 9/2000 | James |
| 6,338,647 B1 | * | 1/2002 | Fernandez et al. .......... 439/490 |
| 6,471,540 B1 | | 10/2002 | Fernandez |

* cited by examiner

*Primary Examiner*—Tho D. Ta
*Assistant Examiner*—X. Chung-Trans
(74) *Attorney, Agent, or Firm*—Alvin S. Blum

(57) ABSTRACT

A jumper cable assembly has a pair of clamps at both ends for parallel connection to a weak and a strong battery for starting a motor. Along the side of the assembly is mounted at least one light emitting diodes (LED) that is powered when either end of the assembly is connected with correct polarity to a battery. The at least one LED may illuminate a fiber optic bundle disposed along the length of the assembly. The assembly lights up along its length to thereby avoid tripping over it when it is being used in the dark. When the assembly is connected to a battery with the wrong polarity, the LED will not light up. In an alternative embodiment, a plurality of LED's are disposed along the length of the assembly. The light emitted may be made to flash or change color to indicate the voltage on the battery to which it is connected.

6 Claims, 3 Drawing Sheets

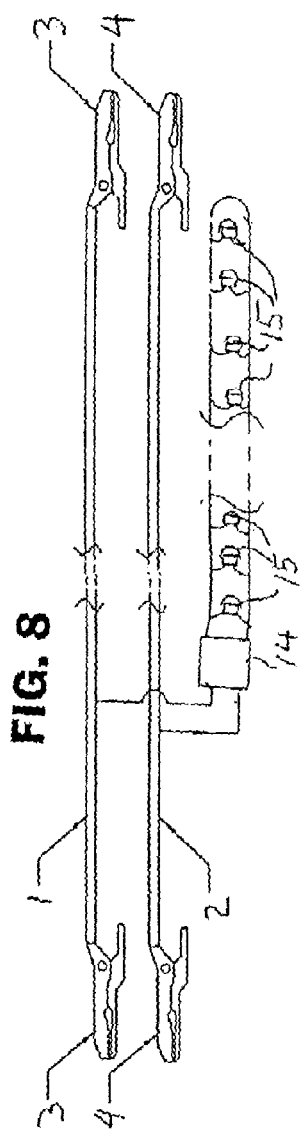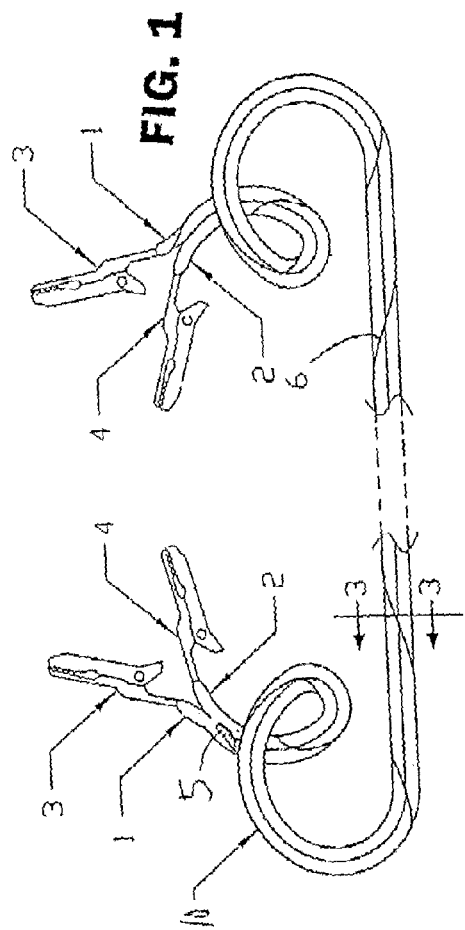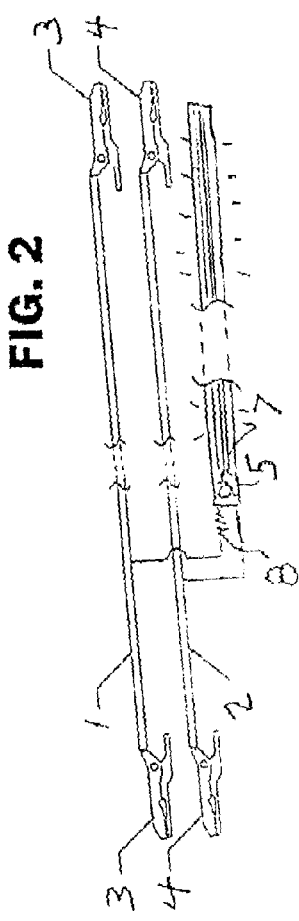

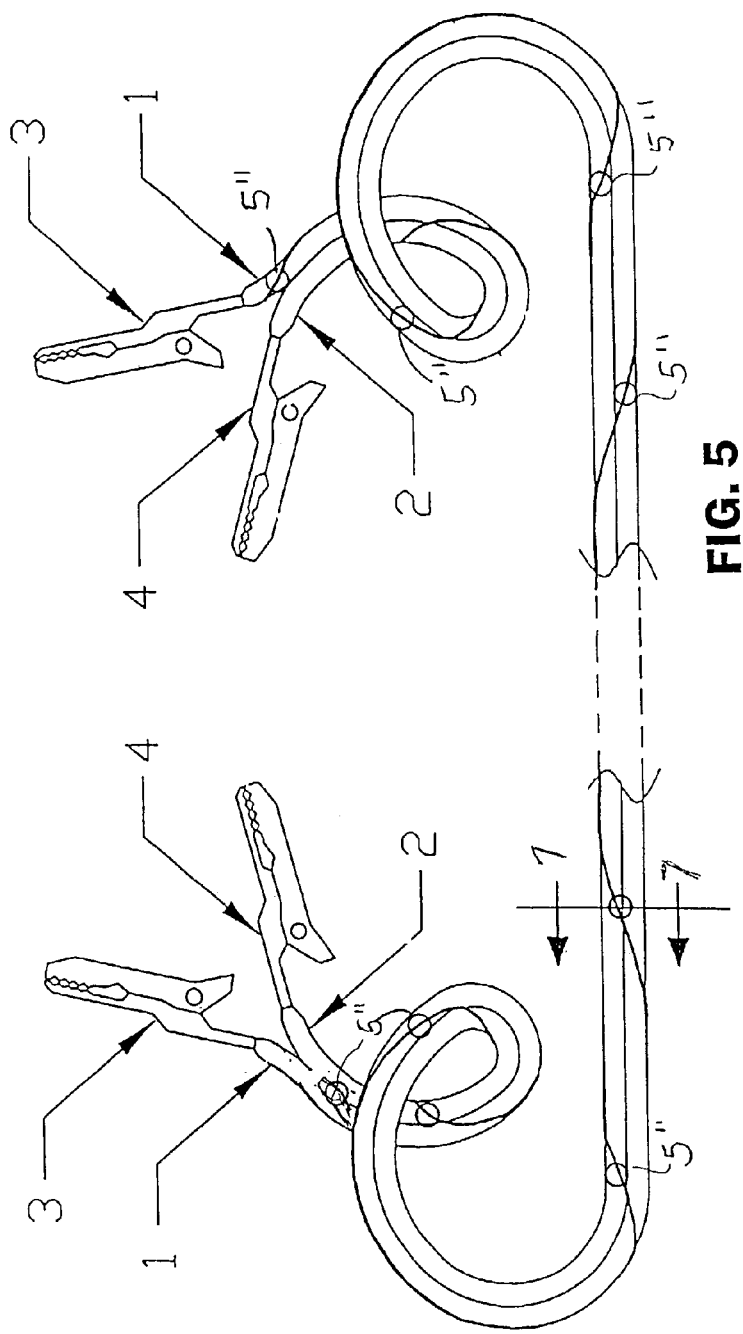
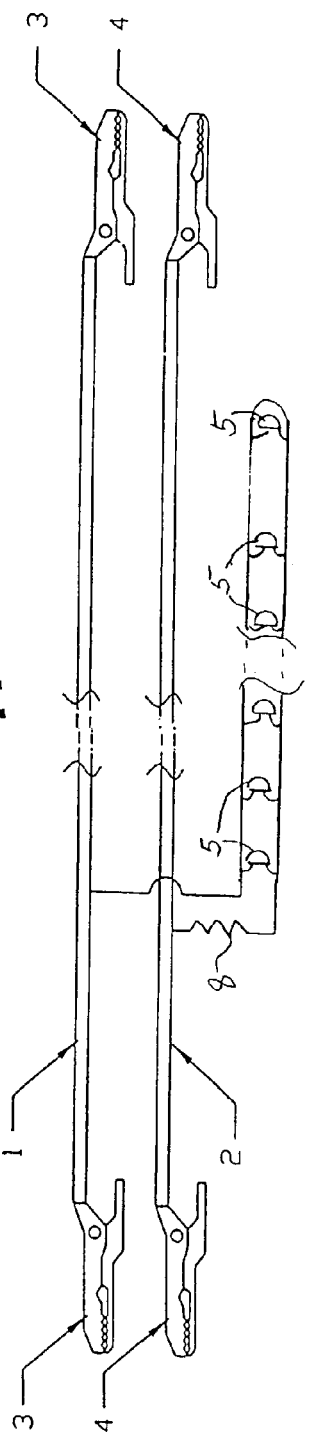
FIG. 5
FIG. 6

LIGHT EMITTING DIODE JUMPER CABLES

This invention relates to apparatus for safe operation of jumper cables, and more particularly to a jumper cable assembly that provides light emitted from light emitting diodes (LED's) alongside the cable.

BACKGROUND OF THE INVENTION

Jumper cables are employed to start a motor when the vehicle battery is too weak by connecting a more powerful battery with the weak battery. This may take place in the dark. Moving around in the dark between the two vehicles to connect their batteries, and then to enter the vehicle to start the motor while the cables are in place can be dangerous. If one trips over the cable, the connections may pull loose and cause sparking, burns, and fires.

U.S. Pat. No. 6,123,576 issued Sep. 26, 2000 to James discloses safety jumper cables that ensure correct connections, but do not address the problem of tripping over the cables in the dark.

U.S. Pat. No. 4,969,834 issued Nov. 13, 1990 to Johnson teaches two separate jumper cable segments with LED indicators of correct polarity connection that are first connected to each battery, and then to each other.

U.S. Pat. No. 3,942,859 issued Mar. 9, 1976 to Korodi teaches an extension cord with a male plug at one end and a female plug at the other end. A bulb energized by the cord illuminates a fiber optic in an elongate channel in the cord insulation to light up the cord along its length. In another embodiment, a neon gas in the channel is energized by the voltage in the cord to light up the cord.

U.S. Pat. No. 6,471,540 issued Oct. 29, 2002 to the applicant discloses a jumper cable assembly illuminated along its length by an electroluminescent element.

It would be useful to have a set of jumper cables that would be luminous along its length by light emitting diodes so that people would be less likely to trip over them in the dark that would also indicate correct polarity.

SUMMARY OF THE INVENTION

It is accordingly an object of the invention to provide a jumper cable assembly that has the usual connections at both ends for connecting two batteries in parallel. It is another object that the assembly emit light along its length when it is connected to at least one of the batteries for safety in avoiding tripping over the assembly. It is yet another object of the invention that the assembly automatically indicate when the proper polarity has been connected by use of inexpensive and trouble-free LED's that indicate polarity and provide light. The jumper cable assembly of the invention includes one or more LED's connected to the positive and negative wires, so that it will light up only when either battery is properly connected. A flexible, elongate fiber optic cable is illuminated by the one or more LED's and disposed alongside the positive and negative wires to thereby illuminate the cable assembly along its length. In another embodiment, a plurality of LED's may be disposed at intervals along the length of the cable to provide sufficient illumination of the cable to prevent someone from tripping over it. If the user connects first to the battery that is more easily seen, the light from the cable will help visualize the other battery. When the user has correctly connected a first battery as indicated by lighting the LED's, the negative terminal can be disconnected and the same procedure followed to connect the second battery correctly.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of the jumper cable assembly of the invention.

FIG. 2 is a schematic diagram of the assembly of the invention.

FIG. 5 is a perspective view of another embodiment of the invention.

FIG. 6 is a schematic diagram of the assembly of FIG. 5.

FIG. 8 is a schematic diagram of another embodiment of the invention.

DETAILED DESCRIPTION OF PREFERRED EMBODIMENTS

Figure 3:
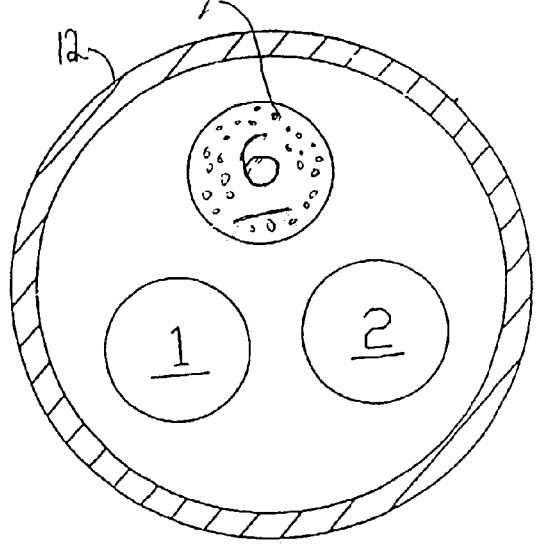
FIG. 3 is a cross sectional view taken through line 3—3 of FIG. 1.

Referring now to the drawing FIGS. 1–3, the jumper cable assembly 10 of the invention includes an elongate, flexible positive wire 1 with clamps 3 at both ends for clamping onto the positive posts of a weak and a strong battery, and an elongate, flexible negative wire 2 with clamps 4 at both ends for connection to the weak and the strong batteries. The preceding structure may be conventional. In addition, the assembly includes an elongate flexible illuminating element 6 attached to the wires, and extending along a major portion of the wires. It may be attached to the wires by various well known means such as enclosing the wires and the element 6 in a transparent plastic sleeve 12, for example. It may be wound on the positive and negative wires in a spiral configuration to be visible from any angle. Wires 1 and 2 are connected to the input 9 of light emitting diode 5 with dropping resistor 8 in the illuminating element 6. A fiber optic bundle 7 in element 6 is illuminated by the LED 5. The bundle 7 is treated to emit light along its length and it extends along a majority of the length of the assembly to avoid tripping over the assembly when in use. The power required by the LED 5 is so low that even the weak battery will light it. If the battery is connected with the wrong polarity, the LED will not light up. This is a clear signal to the user to correct the connection.

Figure 4:
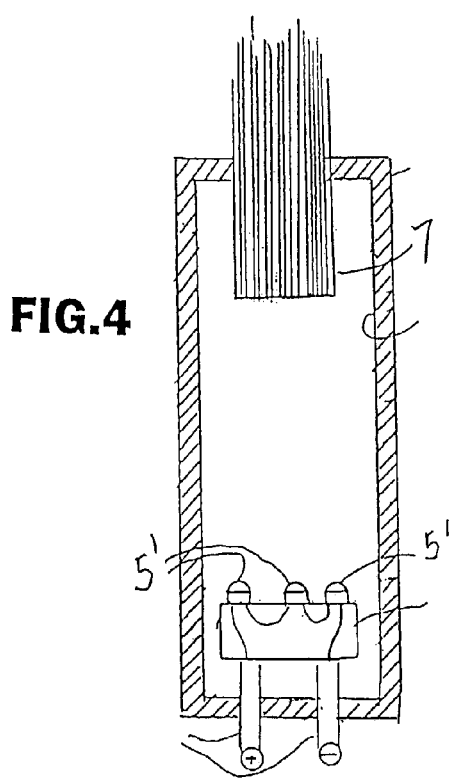
FIG. 4 is a schematic diagram of another embodiment of the invention.

Referring now to FIG. 4, a plurality of LED's 5' are connected in series between the negative wire 2 and positive wire 1. If the assembly is for use with 12 volt batteries, the three 4 volt LED's will light up without any need for a dropping resistor. The fiber optic element 7 is illuminated by all three LED's 5' that may be all the same color, or different colors, as desired.

Figure 7:
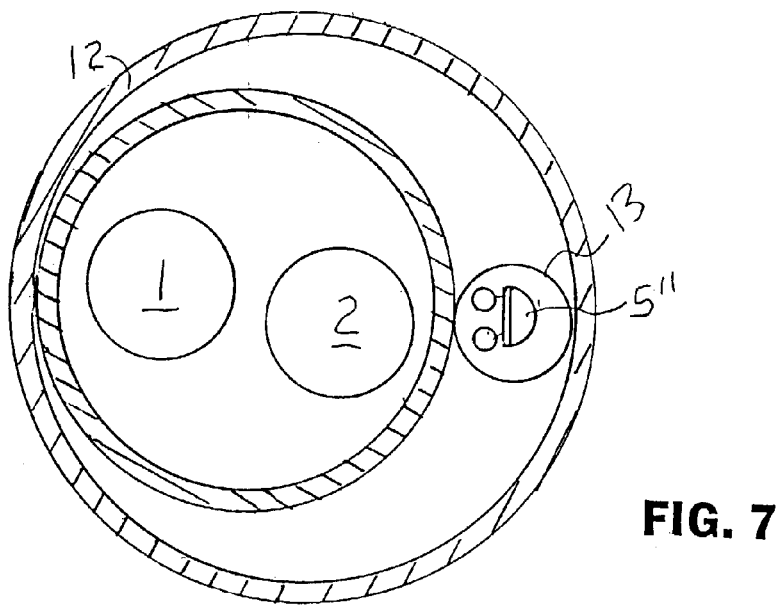
FIG. 7 is a cross sectional view taken through line 7—7 of FIG. 5.

Referring now to FIGS. 5–7, a plurality of LED's 5" are disposed along the length of the assembly for illumination of the length of the assembly without the use of a fiber optic bundle. The LED's may be enclosed in a transparent plastic tube 13 that is spirally wound around the pair of wires 1,2. The combination is then enclosed in the transparent covering sleeve 12.

Referring now to FIG. 8, disclosing another embodiment of the invention, a control circuit 14 powers a plurality of LED's 15 that are disposed along the length of the assembly for illumination of the length of the assembly without the use of a fiber optic bundle. The control circuit 14 is connected to the wires 1,2. When the device is connected to a battery with the correct polarity, the control circuit senses the voltage in the battery and may power the LED's in a variety of manners to indicate the voltage in the battery. For example, the LED's may be made to flash at intervals inversely proportional to the input voltage, with the LED's on continuously when the voltage is normal. Alternatively, the LED's may emit various colors that can indicate the voltage of the battery.

While I have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A flexible jumper cable assembly having a long length with a transparent covering sleeve for connecting to a first battery at one end and a second battery at another end, the assembly comprising:
   a) an elongate positive wire having battery connections at both ends;
   b) an elongate negative wire having battery connections at both ends;
   c) at least one light emitting diode connected between the positive and negative wires so as to emit light only when the battery connections at one end are connected one of the batteries with the correct polarity; and
   d) means for emitting light from the at least one light emitting diode along the length of the assembly to thereby illuminate the length of the assembly when one of the batteries is connected to the positive and negative wires.

2. The assembly according to claim 1 further comprising means for modifying the emitted light to indicate the voltage on the battery to which the assembly is connected.

3. A flexible jumper cable assembly with a transparent covering sleeve for connecting to a first battery at one end and a second battery at another end, the assembly comprising:
   a) an elongate, continuous positive wire of a particular length having a battery connection at each end;
   b) an elongate, continuous negative wire of substantially the same particular length having a battery connection at each end;
   c) a plurality of light emitting diodes connected between the positive and negative wires so as to emit light only when the battery connections at one end are connected one of the batteries with the correct polarity; and
   d) the light emitting diodes disposed along a major portion of the positive and negative wires to move with the positive and negative wires and to emit light along said major portion its length when electric power from one of the batteries is applied to one end.

4. The assembly according to claim 3 further comprising means for modifying the emitted light to indicate the voltage on the battery to which the assembly is connected.

5. A flexible jumper cable assembly with a transparent covering sleeve for connecting to a first battery at one end and a second battery at another end, the assembly comprising:
   a) an elongate, continuous positive wire of a particular length having a battery connection at each end;
   b) an elongate, continuous negative wire of substantially the same particular length having a battery connection at each end;
   c) at least one light emitting diode connected between the positive and negative wires so as to emit light only when the battery connections at one end are connected to one of the batteries with the correct polarity; and
   d) an elongate fiber optic element disposed so as to be illuminated by the at least one light emitting diode, the element disposed along a major portion of the positive and negative wires to move with the positive and negative wires and to emit light along said major portion when electric power from one of the batteries is applied to one end.

6. The assembly according to claim 5 further comprising means for modifying the emitted light to indicate the voltage on the battery to which the assembly is connected.

* * * * *